Figure 4:
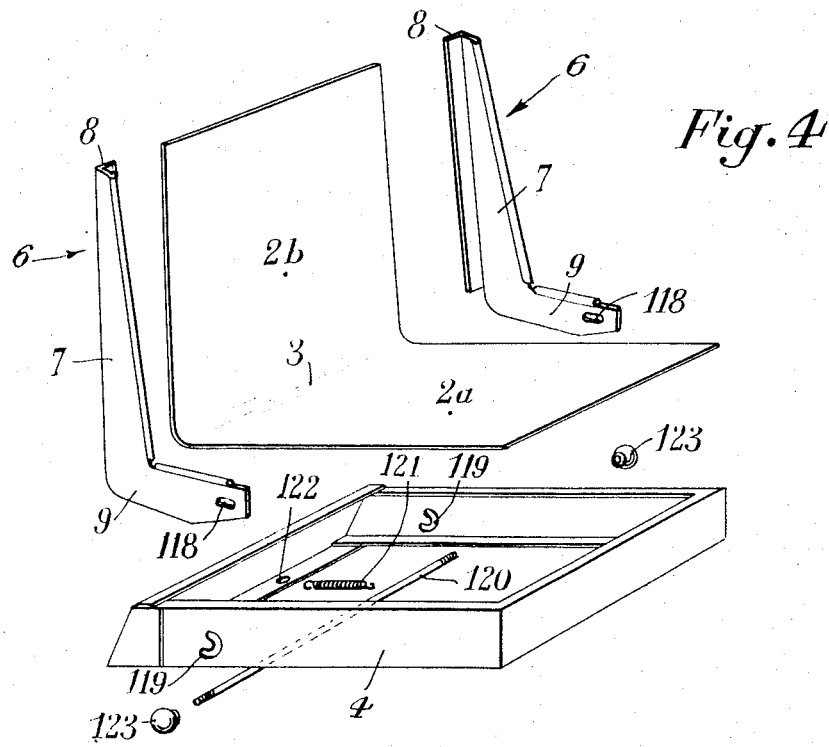

Feb. 14, 1967  R. VINCENS ET AL  3,304,121
METAL CHAIRS
Filed Aug. 10, 1965  9 Sheets-Sheet 1
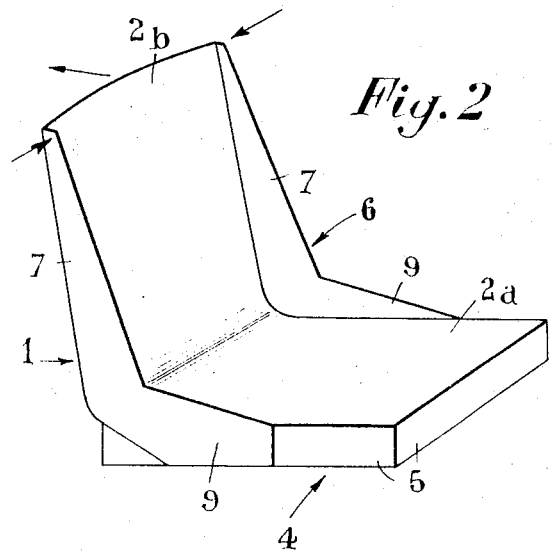
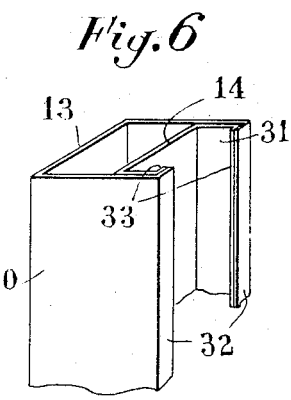
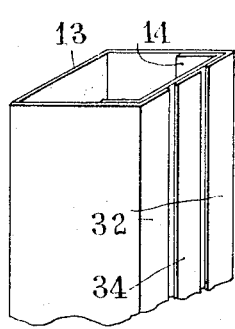
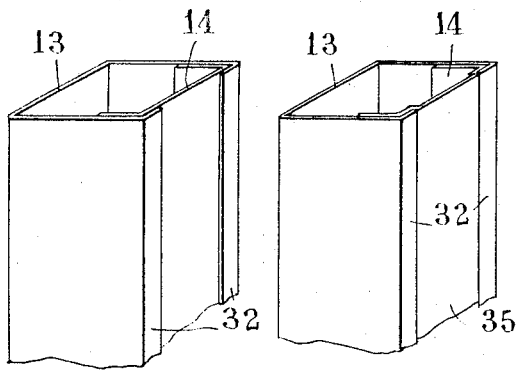
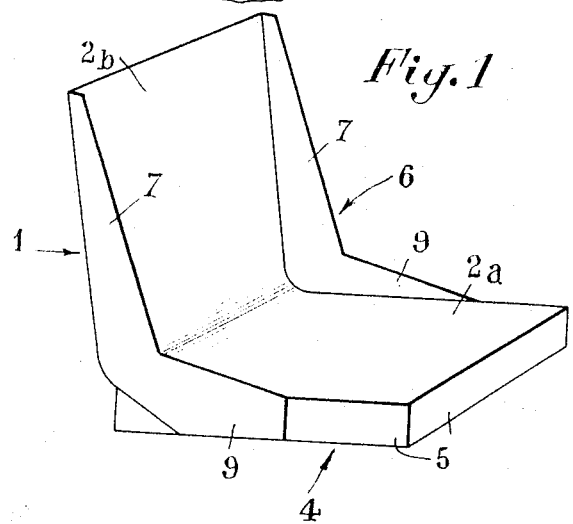

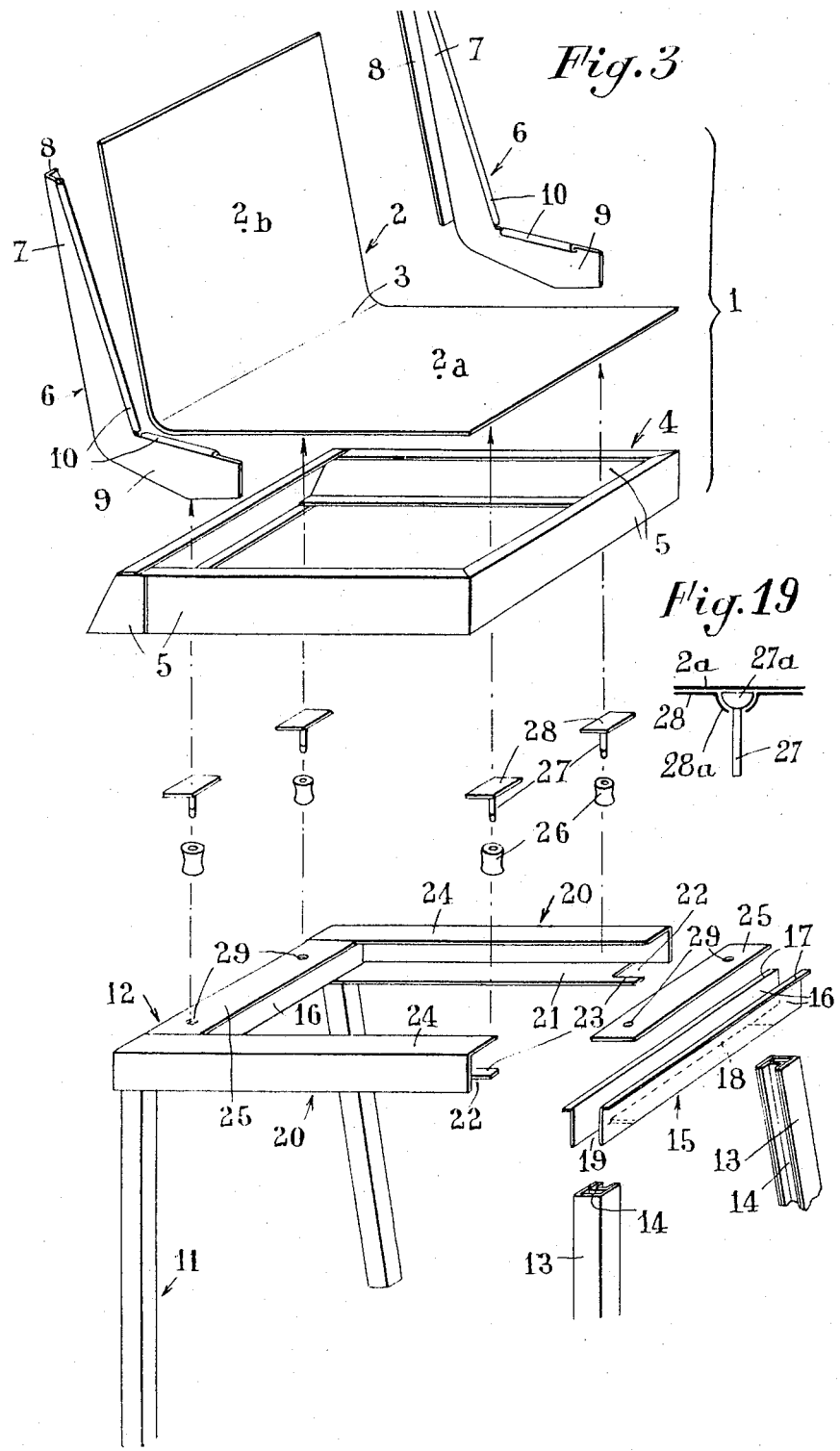

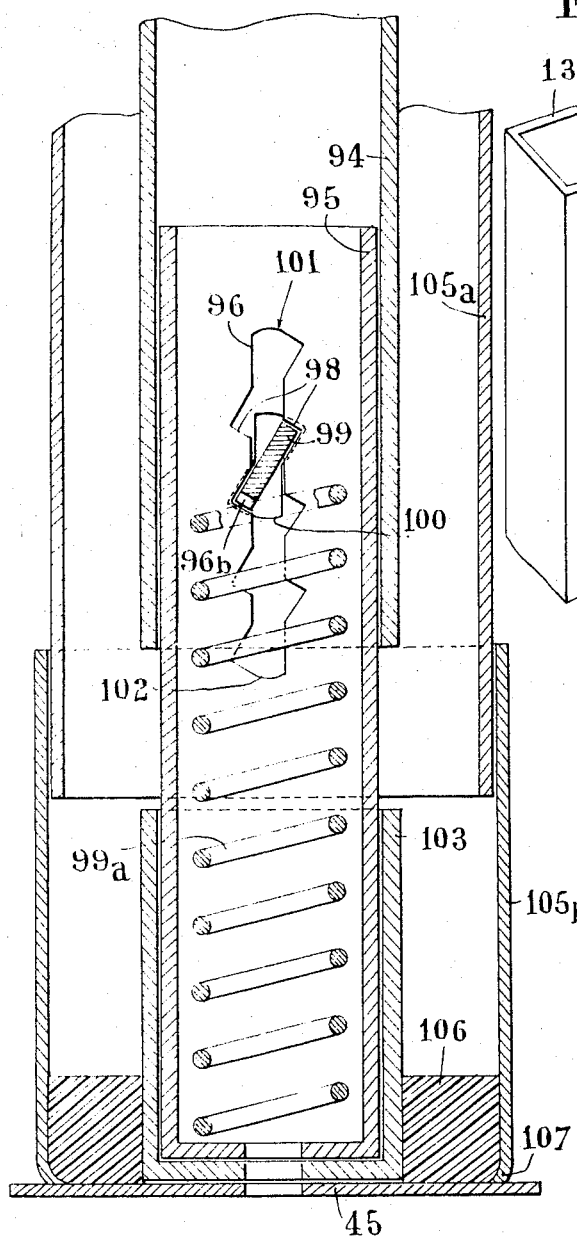
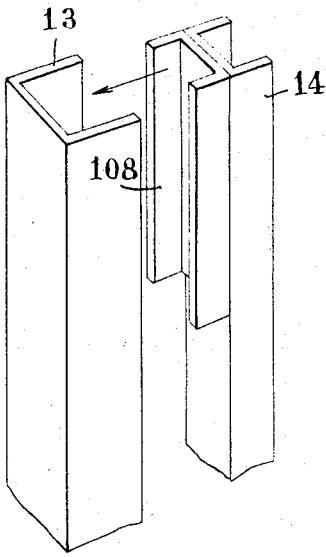
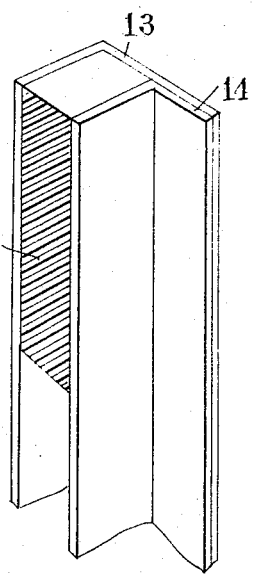

Feb. 14, 1967  R. VINCENS ET AL  3,304,121
METAL CHAIRS
Filed Aug. 10, 1965

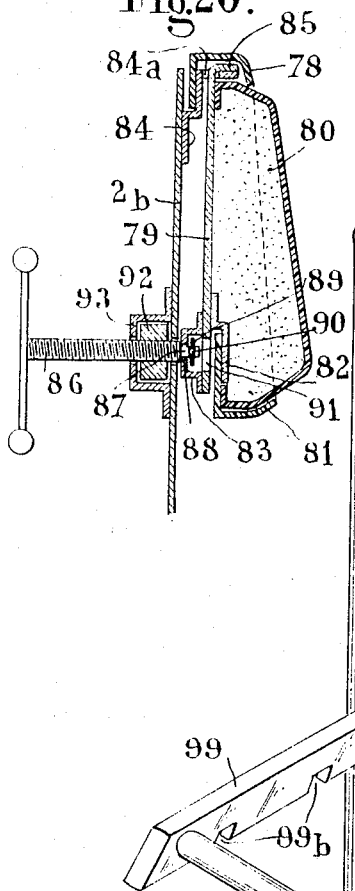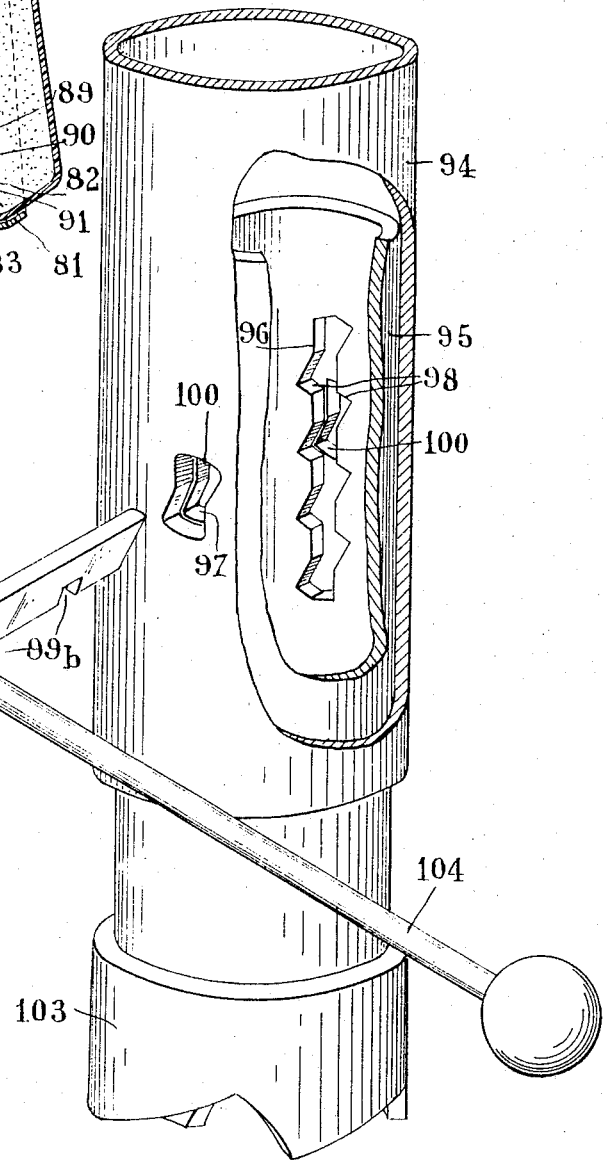

United States Patent Office 3,304,121
Patented Feb. 14, 1967

3,304,121
METAL CHAIRS
René Vincens and François Lemaire, Neuville-les-Dieppe, France, assignors to Societe Civile de Recherches et d'Etudes Industrielles, Neuville-les-Dieppe, France
Filed Aug. 10, 1965, Ser. No. 478,640
Claims priority, application France, Aug. 11, 1964, 984,832, Patent 1,411,823; Oct. 6, 1964, 990,474; Apr. 17, 1965, 13,738
7 Claims. (Cl. 297—445)

The present invention is concerned with metal chairs or seats and more particularly with office chairs characterized in that the two component elements of the chair, that is, the seat proper and the legs, are interchangeable and consist each of an assembly of suitably cut, folded and welded pieces.

The back of this seat consists of a flexible resilient metal sheet provided with reinforcing elements along its longitudinal lower edge and its two vertical edges, and its upper horizontal edge is kept free in order to enable this back, under the pressure of the user's weight, to yield on either side of its median vertical plane in a manner decreasing from its upper horizontal edge to its lower horizontal edge, and to prevent this back from undergoing a deformation in relation to its median horizontal plane.

All the parts constituting these two main seat elements may be made by using the conventional equipment of sheet-iron workshops, such as shearing machines, folding or bending machines, presses, etc., and assembled with one another by means of tongs or spot-welding machines.

The seat forming element of the final assembly consists of a flat metal plate suitably bent in the vicinity of its median portion in order to constitute the seating surface proper and the back, the seat-forming surface being welded to a metal frame along its four sides and the back is also welded along its two vertical sides to a pair of flat metal uprights welded in turn to said frame at their lower portions.

The frame proper consists of four U-sectioned elements having their concavities turned inwards and properly asembled and welded to each other.

The seat uprights consist of an L-shaped sheet-metal element of which the upper, somewhat longer arm has a lip bent at right angles inwards and adapted to be spot-welded to the vertical edges of the back. The lower arm of the L-shaped element is secured by welding to the outer face of the longitudinal sections of the seat frame, and the front edges of both arms are in-turned to eliminate any sharp or cutting edges.

The metal sheet constituting the seat back is thus rigidly held along its three sides, only the upper edge being free of any reinforcement and preserving under these conditions the mechanical characteristics of the metal from which it is made; this metal is preferably selected to have a certain flexibility and resiliency in order to permit the temporary deformation of the back when the chair is occupied, the thickness of the sheet-metal stock being selected to combine a sufficient strength with a certain flexibility. When an effort is exerted on the upper portion of this back this portion undergoes a certain deformation and assumes a curved shape while taking a bearing on both uprights; the back deformation decreases towards the seating surface and becomes zero in the vicinity of its folding zone.

The legs of this chair consists of the welded assembly of four legs consisting each in turn of two U-sectioned metal elements fitting telescopically into each other on a frame made of four-U-sectioned metal elements.

Figure 5:
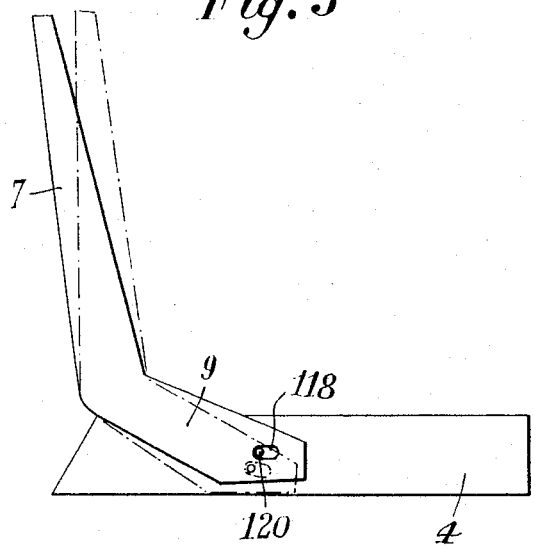
Figure 12:
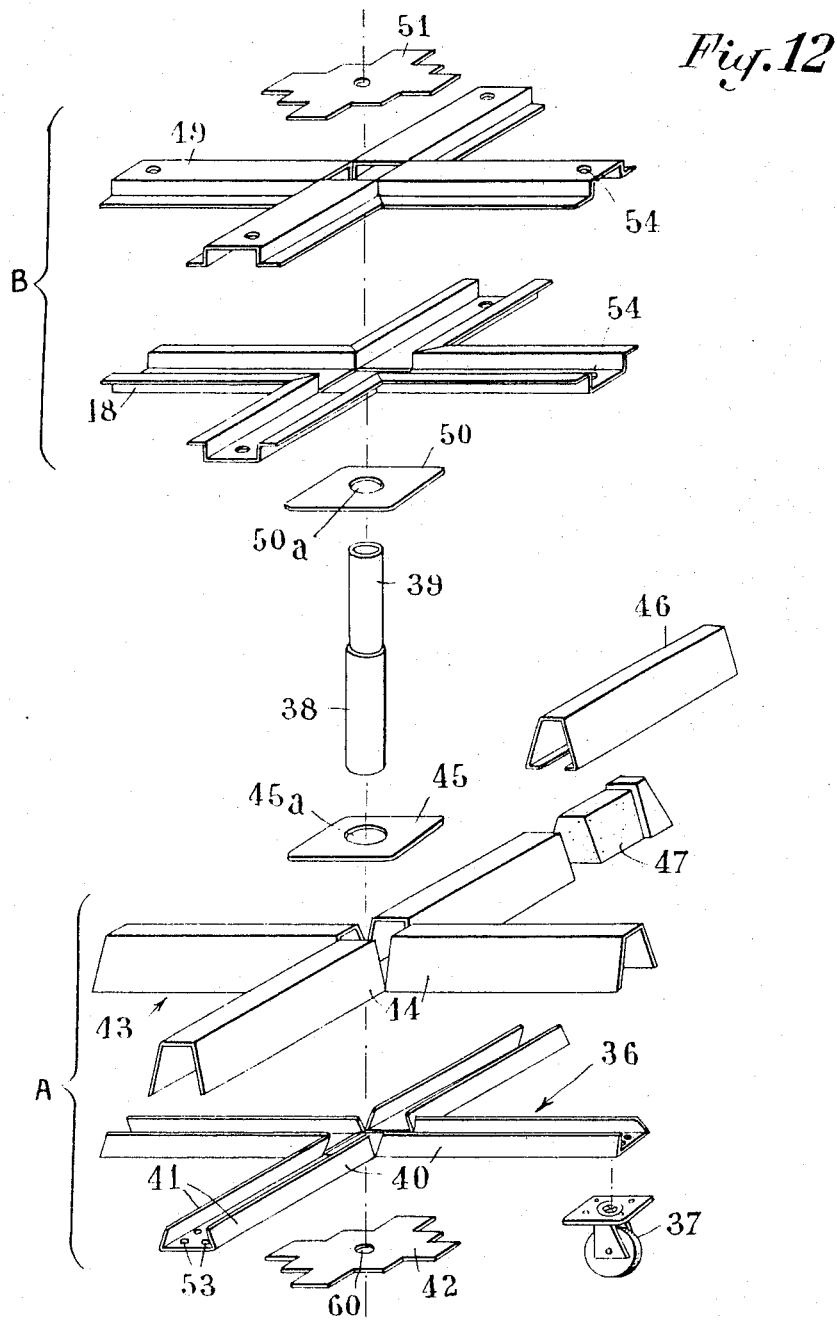
Figure 13:
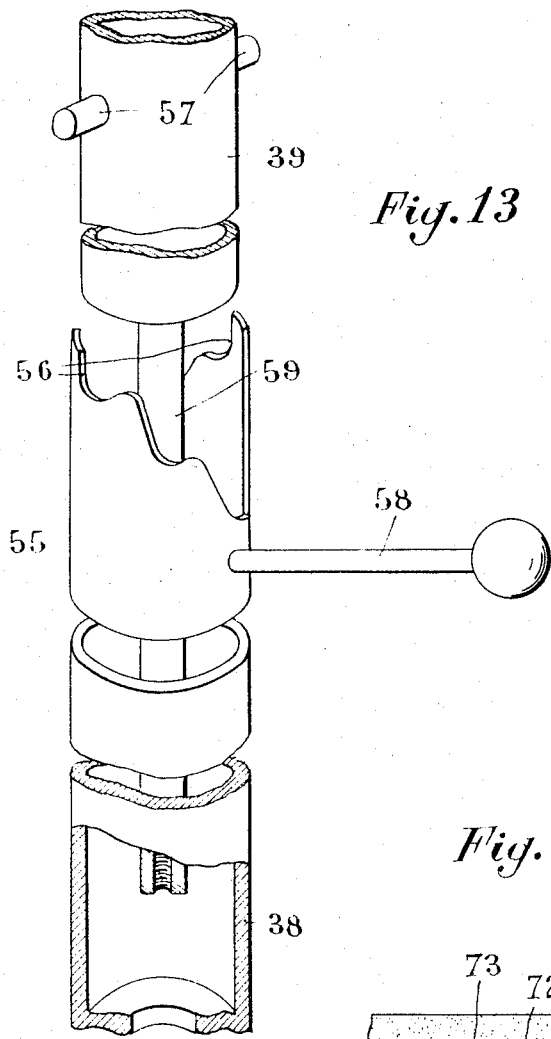
Figure 18:
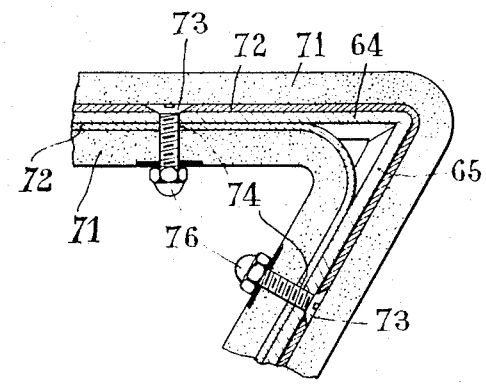
Figure 16:
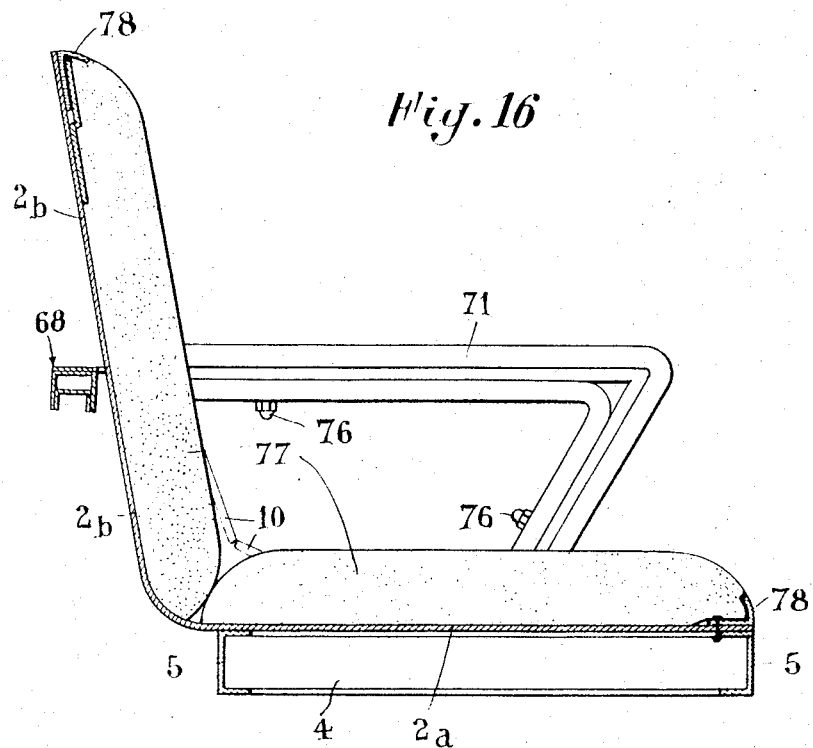
Figure 17:
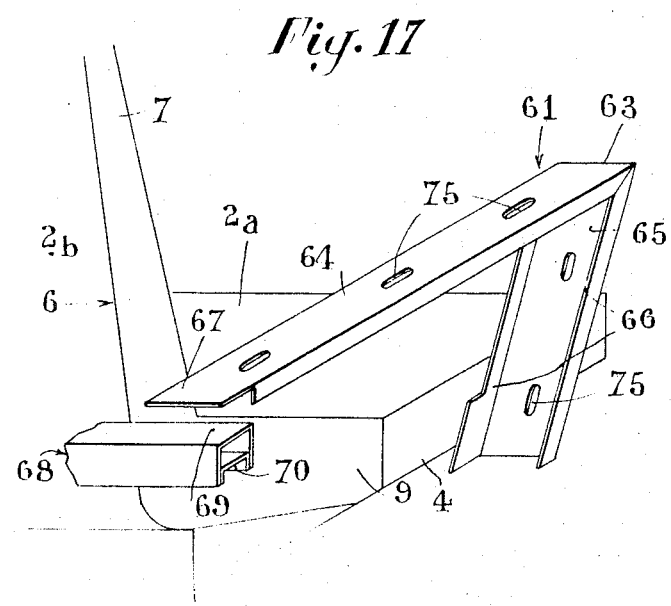
Figure 21:
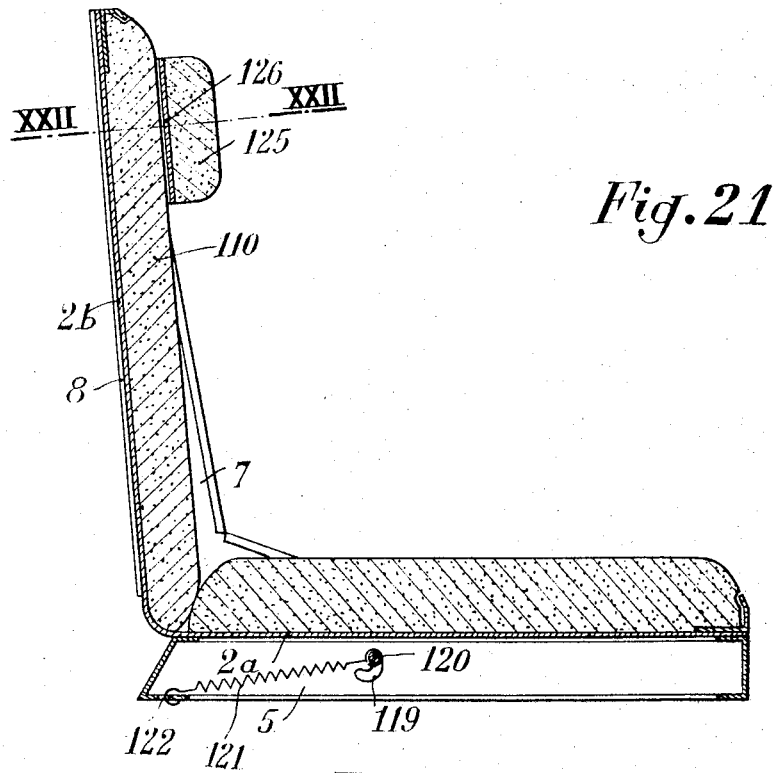
Figure 22:
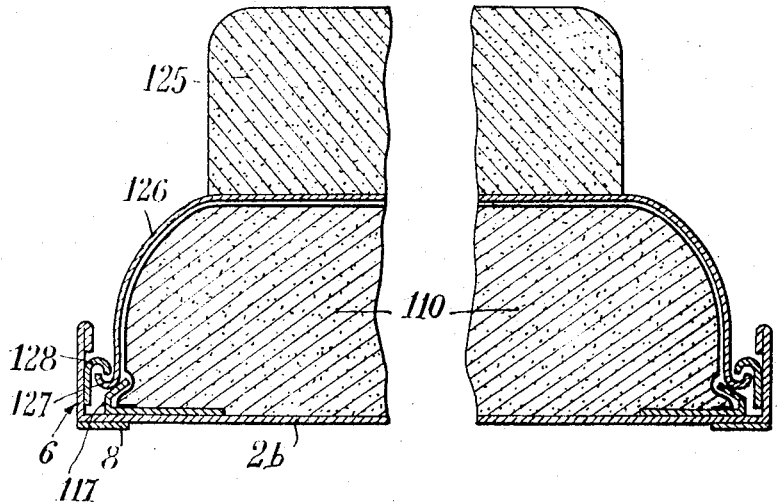

Other features and advantages of the chair according to this invention are described hereinafter with reference to the attached drawings in which:

FIGURE 1 is a prespective view showing the seating element of the chair;
FIGURE 2 is a similar view showing the flexibility of the back element;
FIGURE 3 is an exploded view showing the two main component elements of the chair, the seat and the leg assembly;
FIGURE 4 is another exploded view showing an alternate form of embodiment of the seat equipped with a hinged back;
FIGURE 5 is a side elevational view showing the seat with the back adapted to be set in two positions, one position being shown in chain-dotted lines;
FIGURES 6, 7, 8 and 9 are elevational views showing on a larger scale various forms of embodiment of the leg assembly of the chair;
FIGURES 10 and 11 show in perspective two different arrangements of the leg assembly;
FIGURE 12 is an exploded view showing a modified form of embodiment of the element constituting the leg assembly in the case of a pivoting armchair;
FIGURE 13 is a view showing on a larger scale the device for adjusting the vertical position of the chair of FIGURE 12;
FIGURE 14 is a perspective view with parts broken away showing a modified form of embodiment of the telescopic device for vertically adjusting the chair;
FIGURE 15 is a sectional view of the same device completed with ornamental tubular elements;
FIGURE 16 is a vertical section showing the seat element of an armchair;
FIGURE 17 is a perspective view showing the mounting of the armrests of the armchair of FIGURE 16;
FIGURE 18 is a sectional view showing on a larger scale an armrest of the armchair illustrated in FIGURES 10 and 11;
FIGURE 19 is a detail view showing the connection between the seat and the leg assembly;
FIGURE 20 is a vertical section showing the upper portion of the back of a seat adapted to receive a cushion adjustable to different inclinations;
FIGURES 21 is a vertical section showing the seating surface of a chair of which the back is provided with a second vertically adjustable cushion, and
FIGURE 22 is a horizontal section taken on a larger scale upon the line XXII—XXII of FIGURE 21.

This metal seat is remarkable in that the different component elements of its leg assembly and seat are made from sheet-metal elements cut, folded or bent and welded by using machines conventional in sheet-iron workshops.

The element constituting the seat 1 consists of a plane metal sheet or plate 2 suitably folded in the vicinity of its median portion 3 so as to constitute the seating surface 2a proper and the back 2b.

The seating surface 2a is welded along its four sides to a frame 4 consisting of four U-sections 5 assembled and welded with their concavities turned inside (see FIGURE 3).

The back 2b of this seat is connected to the frame 4 by means of a pair of L-shaped metal uprights 6 made from sheet-metal stock, the upper arm 7 of each upright being slightly longer than the lower arm 9 and formed along its rear vertical edge with a lip 8 bent at right angles inwardly and adapted to be spot-welded to the rear face of the back 2b, and along its vertical edges, the lower arm 9 being seccurred by welding to the outer face of the longitudinal sections 5 of the frame 4, the front edges 10 of the two arms of these uprights being bent on themselves in order to eliminate any sharp edges.

According to a modified form of embodiment (see FIGURES 4 and 5) permitting of constructing a tilting back, the lower arm 9 of the metal uprights 6 is pivoted by means of elongated slots 118 on a transverse rod 120 movable in a pair of crescent-shaped slots 119 formed in the side members of frame 4. This rod 120 is provided with a tension spring 121 anchored in a hole 122 of the frame. This spring is intended more particularly for urging the rod backward in relation to the seat so as to cause the rod normally to engage the ends of the crescent-shaped slots 119. Screwed on the screw-threaded ends of rod 120 are nut-like buttons 123 having blind tapped holes which facilitate the tilting of the back 2b about its intermediate portion 3. By moving this rod the back 2b is flexed and the two lateral uprights 6 can move towards the bottom of their free pivot slots 118.

The leg system of this chair consists of the welded assembly of four tubular legs 11 on a frame 12.

According to another feature characterizing this invention, the legs of this chair consist of a pair of metal U-sections 13 and 14 mounted into each other and welded along their flanges.

These two U-sections 13 and 14 constitute the legs proper of the chair and may have an open square or rectangular cross-sectional contour (see FIGURE 6); they are secured to each other by welding their flanges 30 and 31 and their flanges 32 and 33 bent at right angles towards to each other, respectively; the inner section 14 may be U-shaped and mounted in the other section 13 with its concavity facing inwards (FIGURE 7); these two U-sections 13 and 14 may have different colors and be made from different materials in order to impart the desired fancy appearance to the legs; the gap formed between the in-turned flanges 32 of the external section 13 may be concealed by a finishing bead or strip 34 (FIGURE 8) having preferably the same thickness as the sheet-metal from which this section is made; finally, it is also possible to properly fold the inner section 14 so that the outer face 35 of the bottom portion of this section 14 which fits between the in-turned flanges 32 of the outer section 13 be coplanar with the outer faces of this flange 32, thus giving to the legs the appearance of a continuous, unbroken tube.

The upper portions of each leg may be reinforced by means of a U-section element 108 welded back to back to the U-section 14 of the leg (FIGURE 10). The top of the flanges of this U-section 108 bears against the bottom of the U-section 13 of the leg. This reinforcement is necessary only in the leg portion extending within the frame and one inch or so beyond the limits of this frame. On the other hand, as a substitute for this complementary section 108, a certain amount of plastic material 109 may be cast into the bottom of the tubular portion formed by the leg sections 13 and 14, after the leg has been mounted and welded on the frame; this arrangement will reinforce in a simple and efficient manner all the upper portion of the leg.

The frame 12 of the leg assembly consists of the welded assembly of four U-sections; the two transverse sections 15 of this frame are disposed with their concavities turned upwards, the free edges of their flanges 16 being bent at right angles inwards to constitute two in-turned lips 17 and their bottoms 18 have formed at each end and throughout their width a notch 19 in which one of the seat leg 11 may be slipped and secured by welding the flanges of the outer leg section 13 to the inner face of the flanges 16 of said transverse section 15.

each one of said pair of transverse sections 15, equipped with its two legs 11 is inserted to constitute the frame 12 into the two longitudinal sections 20 of this frame which, to this end, are disposed with their concavities turned inwards, the lower flanges 21 of these sections having formed in their end portions a notch 22 of a size corresponding to the cross-sectional dimension of the legs 11, said flanges 21 being preferably wider than said cross-sectional dimension of legs 11 in order to provide a lug 23; the sections 15 are assembled to the sections 20 by welding their bent flanges or lips 17 under the upper flange 24 of sections 20 and their bottoms 18 on the lugs 23 of said sections 20.

The concavity of the transverse sections 15 is closed by a metal plate 25 of a length corresponding to the relative spacing of the free edges of the two flanges 24 of the longitudinal sections 20 and of a width equal to the total width of said transverse sections 15, this plate being welded to the bent flanges 17 of said sections.

The elastic connection between the seat and the leg system of this chair is obtained by means of four blocks or pads 26 of rubber or like elastomer each slipped on a vertical rod 27 secured on a horizontal plate 28 welded to the lower face of the seating surface 2a and at one corner thereof; the free ends of these rods 27 engage holes 29 formed in the plate 25 and adequate means such as lock-pins, bolts, etc., are provided to prevent them from being released from the holes 29 when the chair is lifted by gripping the seat portion thereof.

It may be advantageous that the aforesaid rods 27 receiving said rubber or like resilient blocks or pads 26 be flexibly secured to the seating surface 2a; to this end, the small plates 28 may have formed at their centre a pressed cup-shaped concavity 28a having a central hole permitting the passage of the corresponding rod 27, this rod 27 being provided with a semi-spherical head 27a fitting in said concavity (FIGURE 22).

The above-described seating structure may be mounted, if desired, on a swivelling leg system also made of cut, bent, folded and welded sheet-metal elements.

This swivelling leg system (see FIGURE 12) comprising in the conventional manner a spider-like structure 36 provided with casters 37 secured to the outer ends of its arms suitably connected to constitute a stand A, a first tube 38 mounted in a vertical position centrally of this stand and having rotatably mounted in turn therein another tube 39 constituting its upwards extension and a support B rotatably solid with the second tube 39 and adapted to carry the seat element of the chair, is characterized in that the aforesaid stand and support are made of suitably designed, shaped and mutually dimensioned metal sections secured to each other in constitute tubular elements.

The stand A comprises four legs 36 disposed crosswise and consisting of four U-sections 40 having slightly convergent flanges 41 extending upwards and welded to a cross-shaped central plate 42; fitting over these sections 40 are other U-sections 43 also disposed crosswise but having their depending flanges 44 parallel and therefore slightly divergent in relation to said sections 40, so that the sections 40 can be secured to sections 43 by simply welding the flanges 41 of the former to the flanges 44 of the latter, the resulting assembly being stiffened by welding on top thereof another plate 45 covering the central or junction area of said sections 43.

Ornamental or finishing elements 46, for example of aluminium, may be slipped on each arm of the spider-like structure 36 and secured by means of an end piece 47 inserted into the end portions of these arms.

The top reinforcing plate 45 has an axial hole 45a formed therethrough to permit the passage of the lower tube 38 bearing on the lower plate 42.

The support B consists similarly of four pairs of superposed sections 48 and 49 disposed crosswise with their concavities facing each other and having their flanges welded by pairs, and of a reinforcing lower plate 50 and upper plate 51, the latter being advantageously cross-shaped; these reinforcing plates are secured by spot welding respectively under the lower sections 48 and on the upper sections 49; the lower plate 50 has a central hole 50a permitting the passage of the upper tube 39 supporting the upper plate 51.

The lower sections 40 of stand A have holes 53 formed through their free ends to permit the fastening of said casters 37 therethrough to the end pieces 47, and the sections 48 and 49 of support B are also provided with registering holes 54 permitting the passage of pins 27 pertaining to the resilient connecting device 26.

A particularly simple device for adusting the vertical position of a seat carried by this swivelling leg system will now be described with reference to FIGURE 13. This device comprises a sleeve 55 of same diameter as the lower tube 38 which is rotatably mounted above this tube and formed with two diametrically and oppositely-inclined rows of stepped notches 56 engageable by a pair of diametrally opposite external pins 57 carried by the upper tube 39. This sleeve 5 is adapted to be rotated manually by means of a lever 58 and the upper tube 39 has a lower extension in the form of a rod 59 of which the lower screw-threaded end projects through a central hole 60 formed in the lower plate 42 of stand A, and a bolt (not shown) adapted to engage the screw-threads of said rod 59 to prevent the tubes 38 and 39 from being disconnected when the chair is lifted by gripping its seat element; a suitable spring (not shown) may advantageously be interposed between said bolt and the lower plate 42 to provide a resilient connection between the tubes 38 and 39 and keep the sleeve 55 clamped between the lower tube 38 and the radial pins 57 of upper tube 39.

The telescopic system illustrated in FIGURES 14 and 15 consists of a pair of concentric tubes 94 and 95 sliding freely in each other. The inner tube 95 is provided with a pair of diametrally opposed vertical slots 96 and 97 each formed with notches 98 on each side, as shown, these notches 98 being shaped to permit their engagement by a flat strip 99 adapted to bear with its lower small face in a notch of the left-hand rack and with its upper small face in a notch of the right-hand rack, or vice-versa. As the slot comprises several rows of notches thus shifted on one and the other side, the flat strip can be positioned at different levels. When the strip is disposed vertically, it can slide freely in said slot.

The external tube 94 has a pair of diametrally opposed elongated holes 100 formed therein, these holes being either circular and of a diameter permitting the passage of said strip 99, or of any other suitable configuration permitting the pivotal movement shown in FIGURE 14.

The slot 96 limits the permissible vertical stroke of strip 99 at an upper dead centre 101 and at a bottom dead centre 102; therefore, it limits the permissible movement of tube 94 with respect to the internal tube 95.

When the flat strip 99 is inclined, it engages the first pair of notches 98 occurring in its path, thus locking the lower tube with respect to the upper tube at the level corresponding to the position of the notches 98.

To permit the rotation of the tubes 94 and 95 as a whole, the lower end of tube 95 is introduced into tube 103 secured to the stand by means of the plate 45 rigid therewith. A shouldered screw (not shown) secures the tube 95 to said tube 103 while permitting its rotation in relation to the seat; a ball-bearing plastic ring or like device may be inserted therein to facilitate the relative swivelling movements.

The vertical adjustment of the seat position may be facilitated by fitting a spring 99a within the tube 95 between the lower edge of the flat strip 99, provided to this end with notches 99b, and the bottom of tube 95. This spring must be strong enough to automatically return the seat to its uppermost position when the flat strip 99 is disposed vertically, thus facilitating the upward adjustment of the seat. To lower the seat, the user's weight will compress the spring and permit the downward adjustment. The weight of lever 104 is sufficient to urge the flat strip 99 to its inclined locking position.

The first turn of spring 99a engages the notches 99b formed in the flat strip 99, thus locking same in the lateral direction.

It may be necessary to contemplate a lining of this adjustable column; this lining may advantageously be obtained as shown in FIGURE 15 by using two concentric tubes of decorative materials 105a and 105b mounted respectively on the seat stand and under the seat element.

In order to maintain the centering of these tubes about the central column after having positioned them with precision, a ring of plastic material 106 may be cast between the tube 103 and tube 105b. After this plastic material has set, the decorative tube cannot be put out of centre in relation to the central column. To compensate the effects of a possible shrinking of this material, the lower edge 107 of the outer tube may be pressed inwards to prevent the tube 105b from slipping upwards. A similar arrangement may be resorted to for securing and centering the upper decorative tube 105a in which a hole is formed for receiving the flat strip 99.

The seat element described hereinabove with reference to FIGURES 1 to 3 may easily be provided with armrests 61. These armrests consist each of a U-section mounted with its concavity turned downwards, and suitably bent at 63 to constitute the armrest proper 64 and its support 65 extending downwards, which are secured by means of their flanges 66 respectively to the upright 6 of the seat element and to the frame 4 thereof (see FIGURE 17). The rear ends 67 of both armrests are on the other hand interconnected by means of a tubular member 68 by being fastened to the outer end of this member; this member 68 consists preferably of a pair of U-sections 69 and 70 fitting in each other according to the procedure described hereinabove in connection with the leg system of the chair; this connecting member 68 is not attached to the back 2b, on the contrary, it is somewhat spaced therefrom in order not to interfere with its elasticity.

An elastic upholstery or like lining may easily be secured on the top and underface of armrests 61 (FIGURE 18). To this end, two strips 71 of preferably cellular elastic material are secured each on a metal plate 72 provided with screws 73 for the upper portion of the armrest and with holes 74 for its lower portion; holes 75 are formed in the armrest to permit the passage of said screw 73, and blind nuts 76 are tightened on said screws 73 in order to hold the two lining strips in position on either side of the armrest; adequate finishing pieces or beads may be disposed on the joints.

On the seating surface 2a and back 2b a pair of cushions 77 consisting preferably of cellular material (FIGURE 16) are advantageously cemented, the edges of the seating surface proper and of said back being advantageously provided with a moulding strip 78 secured in a suitable manner and adapted to hold the edges of said cushions against their supports while improving the appearance of the assembly.

If the seat structure according to this invention is designed as a typewriter's seat, it is advantageous to provide on its back a loins-supporting cushion adjustable to different inclinations with a view to improve its bearing smoothness while preserving the flexibility and comfort of the seat back. To this end the cushion is secured on a flexible and elastic metal plate of which the upper edge is anchored to the upper edge of the back structure in such a way as to permit the pivoting movement of this plate about this upper edge of the back structure, and means disposed in the vicinity of the lower edge of the pivoting plate bearing on said back, preferably in the central region thereof, in order adjustably to hold the lower edge of the pivoting plate somewhat spaced from the back.

With this construction, the lower edge of the cushion can be moved towards and away from the back and therefore the cushion inclination can be adjusted while preserving the flexibility and therefore the comfort of the back; in fact, the efforts applied to the cushion are transmitted directly to the back through the adjustment means.

According to this invention, suspended from the upper portion of the back 2b is a metal plate 79 carrying the cushion 80 (see FIGURE 20). An ornamental mounding 81 is secured to the lower edge of said plate 79 by means of elements 82 welded to said plate 79 and covering part of the lower edge of the cushion. The base of plate 79 is stiffened by an omega-sectioned member 83 having its flanges welded along the lower edge of said plate.

Angle sections 84 provided with elongated holes 84a are secured to the upper portion of the back 2b and the upper edge of plate 79 comprises lugs 85 bent at right angles to constitute hook means engageable in said elongated holes 84a so as to be pivotally suspended from the angle sections 84. These angle sections 84 are also used for securing the strip or moulding 78 which consists preferably of flexible material in order not to interfere with the curvature of the upper portion of the back.

To permit the adjustment of the inclination of said cushion 80 in its assembled or suspended position, a screw 86 extends through the back and engages with one end the omega-sectioned member 83; a shouldered portion 87 at this screw end engages the hole 88 formed in member 83 and a circlip 89 engaging a groove 90 retains the screw in the lower portion of the cushion plate 79; a slot 91 formed in plate 79 permits the fitting of this circlip. The screw 86 engages a nut 92 secured by means of a socket 93 on the rear face of the back structure. This arrangement assembles the lower portion of cushion 80 with said back structure.

When the screw 86 is rotated in one direction, the lower portion of the cushion moves away from the back while continuing to transmit to the latter the effects received by it. The specific mounting of the upper edges permits a deformation of the plate 79 under the same conditions as in the case of a back structure not equipped with the adjustable cushion 80.

The steps of gluing the cushion 80 and fastening the moulding 81 should be carried out only after the plate 79 has been attached to the upper edge of the back and connected to the screw 85.

It may also be advantageous to provide for example the tilting back of a seat of the type illustrated without the cushions of FIGURES 4 and 5 with a vertically adjustable cushion, with a view further to increase the comfort of a typewriter's chair. This cushion consists of an upholstered auxiliary cushion 125 mounted on a thin plate support 126 curved to accommodate the lateral shape of the back 10 and clamp with its bent edge 27 a channel 128 solid with the uprights 6 while being guided by the reinforcing elements 117 of the back 2b (FIGURES 21 and 22).

Thus, this auxiliary cushion may slide vertically to the desired position and be locked therein by means of conventional devices.

What we claim is:

1. Metal chair comprising a seat consisting of a plane metal sheet bent to more than 90 degrees approximately in its median portion to constitute the seat and back, of a frame made of metal sections having welded thereon said seat surface along its four sides and said back along its lower horizontal edge, of a pair of plane metal uprights each in the form of a metal plate cut to a substantially L-shaped configuration, the horizontal portion of each upright being adapted to be welded to the sides of said frame each upright having at its upper end a portion bent at right angles and adapted to be welded to the edges of said back, of four legs made of metal section, of a leg assembling frame adapted to be secured to said seat frame, and of a pair of arm-rests consisting of metal section elements secured to said seat frame and to said uprights.

2. Metal chair as set forth in claim 1, comprising a frame consisting of four U-sections assembled and welded with their concavities directed inwardly, the lower wings of said U-sections comprising means for assembling same to said leg frame.

3. Metal chair as set forth in claim 1, wherein each one of the lower arms of said lateral uprights has an elongated aperture formed therein, each lateral section of the seat frame having formed therein a crescent-shaped aperture registering with the pertinent upright aperture, a rod engageable in said upright and frame apertures for hingedly assembling said metal back uprights and said seat frame, a tension spring having one end attached to said seat frame and its opposite end anchored to said rod to resiliently hold said rod in engagement with one or the other ends of said apertures.

4. Metal chair according to claim 1, wherein said arm rests are each made from a U-sectioned element mounted with its concavity directed downwardly, said U-sectioned element being suitably bent and secured by its inner wings to the pertinent seat upright and frame, a horizontal tubular member bracing the rear ends of the two arm rests, said tubular member consisting of a pair of interfitting U-sectioned members having registering concavities and welded along their thus assembled wings, said tubular member being independent of, and slightly spaced from, said back.

5. Metal chair as set forth in claim 1, wherein said seat surface and said back are each provided with cushioning means, upholstering means covering said cushioning means, a flat frame having glued thereon one of said cushioning means by its rear face, said metal frame having a certain inherent elasticity, and a cushion-retaining frame bounding only three sides of said cushioning means, the outer edges of said cushion frame being adapted to be located and wedge in said retaining frame.

6. Metal chair as set forth in claim 1, comprising a metal plate pivotally mounted on the upper edge of said back, cushion means secured to said edge, a screw engaging a nut rigid with said back end bearing against said metal plate to permit the adjustment of the plate inclination in relation to said back.

7. Metal chair as set forth in claim 1, comprising for said back another cushion, a thin sheet-metal support on which said other cushion is mounted, said support being curved to accommodate the lateral contour of the back cushion edge, bent portions formed at the free ends of said support, a channel solid with each one of said uprights and adapted to co-act with said bent portions, the back reinforcing elements being adapted to assist in guiding the movements of said thin sheet-metal support.

References Cited by the Examiner

UNITED STATES PATENTS

| | | | |
|---|---|---|---|
| 1,879,126 | 9/1932 | Dellert | 297—239 |
| 2,745,468 | 5/1956 | Kramer | 297—445 X |
| 2,788,846 | 4/1957 | Hauser | 297—457 X |
| 2,901,028 | 8/1959 | Bottemiller | 297—421 |
| 3,073,649 | 11/1963 | De Montfort | 297—396 |
| 3,197,165 | 7/1965 | Gits | 248—187 |
| 3,223,450 | 12/1965 | Pollock | 297—445 |

FOREIGN PATENTS 534,400  10/1955  Italy.

FRANK B. SHERRY, *Primary Examiner.*

CASMIR A. NUNBERG, *Examiner.*